Oct. 26, 1943.    A. M. SKELLETT    2,332,977
SPACE DISCHARGE DEVICE AND CIRCUITS
Filed July 31, 1941    4 Sheets-Sheet 1

INVENTOR
A. M. SKELLETT
BY
H. A. Burgess
ATTORNEY

Oct. 26, 1943.   A. M. SKELLETT   2,332,977
SPACE DISCHARGE DEVICE AND CIRCUITS
Filed July 31, 1941   4 Sheets-Sheet 2

INVENTOR
A.M. SKELLETT
BY
H. A. Burgess
ATTORNEY

Oct. 26, 1943.　　A. M. SKELLETT　　2,332,977
SPACE DISCHARGE DEVICE AND CIRCUITS
Filed July 31, 1941　　4 Sheets-Sheet 3

INVENTOR
A. M. SKELLETT
BY
J. A. Burgess
ATTORNEY

Oct. 26, 1943.    A. M. SKELLETT    2,332,977
SPACE DISCHARGE DEVICE AND CIRCUITS
Filed July 31, 1941    4 Sheets-Sheet 4

INVENTOR
A.M. SKELLETT
BY
H A Burgess
ATTORNEY

Patented Oct. 26, 1943

2,332,977

UNITED STATES PATENT OFFICE 2,332,977

SPACE DISCHARGE DEVICE AND CIRCUITS

Albert M. Skellett, Madison, N. J., assignor to Bell Telephone Laboratories, Incorporated, New York, N. Y., a corporation of New York Application July 31, 1941, Serial No. 404,815

17 Claims. (Cl. 250—27)

The present invention relates to space discharge apparatus and circuits therefor. More particularly, the invention relates to a beam tube with provision for variably controlling the beam to secure novel and useful effects.

A general object of the invention is to augment the effect of a voltage variation by reaction upon the beam control.

This may be attained in accordance with the invention by self-focusing together with a suitable construction and arrangement of the tube electrodes. In the embodiments to be disclosed in detail hereinafter the emission from the cathode may go in part to a plate of comparatively large superficial area and in part to an anode of smaller area when there is little or no concentration of the emission into a beam. The output current divides between the plate and anode under this condition and initially the emission is small and may be mainly to the plate. As the emission becomes concentrated into a beam, it goes in greater and greater proportion to the anode as the focusing increases. This increases the portion of the output current carried by the anode relative to that carried by the plate. The resultant decrease in plate current causes a decrease in potential drop across its coupling resistor and hence, an increase in plate potential. This increase in plate potential greatly augments the space current in the tube by drawing out more electrons from the cathode. The focusing is produced in part by reaction of the output current or voltage upon the beamforming means so that an initial variation in a direction to increase the output current causes the current to be further augmented by reaction, giving a trigger type operation, somewhat similar to that obtained with a gas-filled tube.

The nature of the invention and its various objects and features will be more fully apparent from the following detailed description of illustrative embodiments shown on the drawings.

Figure 1:
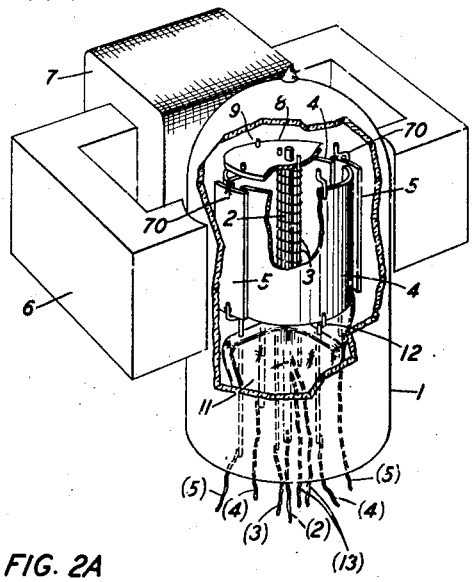
Fig. 1 is a perspective view partly broken away to show internal structure, of a tube construction in accordance with the present invention, employing magnetic focusing.
Figure 2:
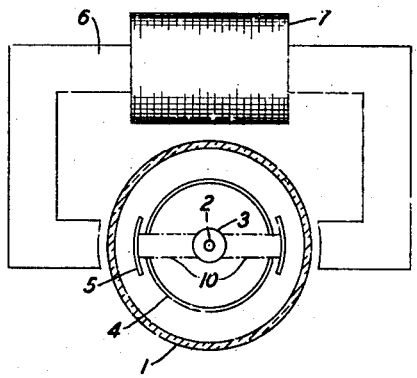
Fig. 2 is a plan view looking down from above in Fig. 1 with the tube itself sectioned.

Referring to Figs. 1 and 2, the tube is shown as having a generally cylindrical shaped envelope 1 within which are a cathode 2, at the center, adapted to be heated by a heater winding not shown but assumed to be inside the cathode in accordance with known practice; a grid 3 surrounding the cathode, a split cylinder or plate 4 in two sections with gaps diametrically opposite each other, and anodes 5, 5 positioned back of these gaps.

Surrounding the tube is a magnetic yoke 6 provided with a winding 7, for producing a focusing field of the type more fully disclosed in my prior Patent 2,217,774, granted October 15, 1940. When the field is absent the emission from the cathode spreads out in all directions going mostly to the plate 4 which has large superficial area, only a small portion reaching the relatively small anodes 5. When the focusing field is at maximum strength the emission is focused into two beams shown at 10 in Fig. 2, converging on the anodes 5, so that practically the entire cathode emission is directed toward the anodes.

No attempt is made in Fig. 1 to show constructional details but the general construction is indicated. The electrodes are supported from a press 11 by stiff rods 12, and a centering disc 8 of Micarta is shown above the tops of the electrodes with stubs 70 welded to the plates and anodes and projecting through holes to support the electrodes laterally. Cathode 2 is shown with a stem also projecting through disc 8, as do also the end of the grid supporting wires. The leads are brought out through the press, the heater leads being shown at 13 and the other leads being numbered the same as the corresponding electrodes. The two anodes may be connected together within the tube and the two plates may be connected together within the tube.

Figure 3:
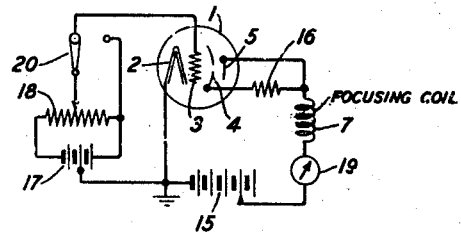
Figs. 3, 4, 5, 6, 7 and 8 are simplified schematic diagrams of circuits for using the tube of the invention with magnetic focusing.

In the circuit of Fig. 3, a battery 15 is connected between the cathode 2 and in common to the anode 5 and plate 4, the latter being positive. A high resistance 16 is connected in the lead to the plate 4. Focusing coil 7 is in series with both the anode and plate. An indicator is connected in circuit at 19. Battery 17 and potentiometer resistance 18 enable potentials of different magnitudes to be applied to the grid as the slider is moved along the resistance.

Starting with the grid bias beyond cut-off and therefore with the space current zero, as the grid potential is made less negative, electrons will start to flow to the plate and anode, most of them going to the plate at first since there is little or no focusing. As the space current is increased the focusing action increases due to current in winding 7 and electrons are diverted from the plate to the anode. When a critical value of grid bias is reached, enough electrons are flowing to start appreciable focusing and as this degree of focusing takes place it deprives the plate of electrons to a marked extent, diverting them to the anode. This causes the potential of the plate to swing in the positive direction due to the lowered potential drop across resistance 16, and this has the effect of drawing out more electrons, thereby accelerating the focusing action and the tube triggers on.

If now the grid bias is made negative in increasing amount the tube will for a time remain triggered on until, notwithstanding the high potential on the plate, the grid bias is sufficient to reduce the space current below that necessary for focusing and the tube triggers off.

Figure 9:
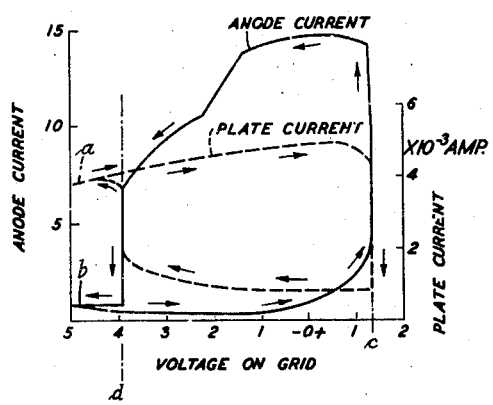
Figs. 9, 10 and 11 show operating characteristics for certain of the circuits of the previous figures.

The entire cycle of operation is shown by the plots on Fig. 9, the cycle in this case beginning with the plate current at $a$ and the anode current at $b$ and progressing with the arrows around the cycle finally returning to points $a$ and $b$. In this case the tube triggers on at the grid voltage value $c$ and triggers off at the grid voltage value $d$. In this case resistance 16 was 10 megohms and the plate voltage depended upon the diameter of tube used, being 130 volts in one case and 450 volts in the case of a larger diameter tube (cylindrical plate, 3 inch diameter).

Figure 2A:
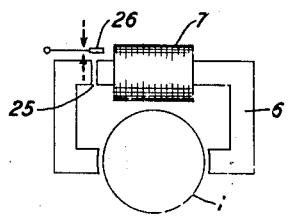
Fig. 2A is a similar partial view representing a modified magnetic yoke structure to provide relay operation.
Figure 4:
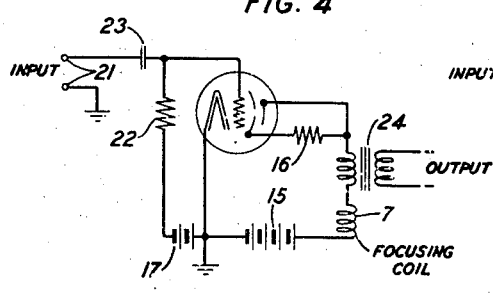

A circuit for utilizing the tube in this way as an amplifier or pulse producer is shown in Fig. 4, the input being at 21 and the output being taken off through transformer 24. Grid coupling resistance and capacity are shown at 22, 23. Instead of using a separate output coupling 24, the output can be coupled directly to the winding 7, conductively or inductively. If relay action is desired for closing and opening contacts, the relay winding may replace transformer 24 or by providing a small air-gap in the magnetic circuit as at 25 in Fig. 2A and mounting a movable armature 26 opposite this gap, the structure 6, 7 may itself serve with armature 26 as a relay for closing contacts as shown. The armature is retracted to normal position by spring tension.

Figure 5:
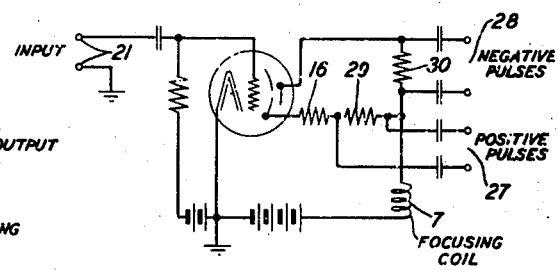

If the tube is used as an impulse producer, as in Fig. 5, one output may be provided at 27 for the positive pulses (in phase with the driving voltage at 21) and another output at 28 for the negative pulses (opposite phase). The positive pulses are produced in the plate lead in coupling resistor 29 which may be a part of resistor 16. The negative pulses are developed in the anode lead in coupling resistor 30.

Figure 10:
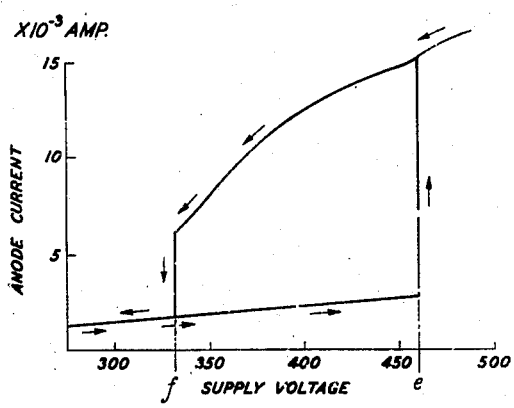

A trigger type action may be obtained from varying the potential supplied from battery 15 (Fig. 3) and adjusting the grid circuit at 20 so that the grid is biased at a constant voltage. The characteristic curve for this condition is given in Fig. 10. The grid bias for this curve was +1 volt. As the plate voltage $e$ is exceeded the tube suddenly triggers on, and it triggers off with decreasing plate voltage at $f$.

Figure 6:
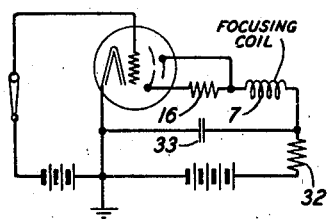

This action, as one example, may be applied to a relaxation oscillator, illustrated in Fig. 6, in which the grid may be used but need not be used. The second external resistance 32 and large capacity 33 have been added to the basic circuit. Assuming the instant in the cycle at which the current through the tube is zero or at its minimum value, capacity 33 charges in series with resistor 32, and as the potential builds up across condenser 33 the point $e$ (Fig. 10) is reached at which the tube triggers on and the condenser discharges through the tube thus lowering the applied potential below the point $f$ (Fig. 10) and causing the tube to trigger off, after which the cycle repeats itself.

Figure 7:
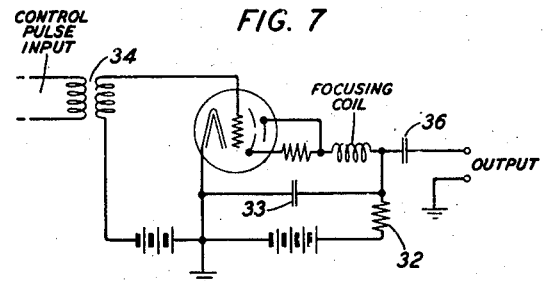

The grid may be used advantageously to synchronize the relaxation oscillations with applied pulses, and a circuit for this purpose is shown in Fig. 7. The control pulse is applied through any suitable input coupling, illustrated as transformer 34. The action of the tube is the same as in Fig. 6 except that the oscillations cannot occur unless the grid potential is driven in a positive direction, which is done by the control pulse. The oscillations may be taken off and used in an output circuit coupled across resistor 32 through capacity 36, for example.

Figure 8:
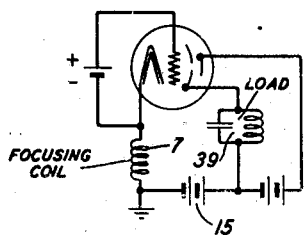
Figure 11:
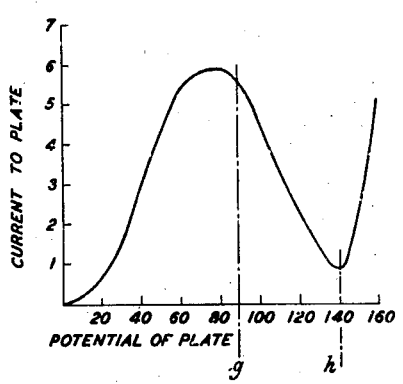

It is found that over a certain range of supply voltage a negative resistance effect is obtained in the circuit to the plate as indicated by the characteristic given in Fig. 11, the falling characteristic being between plate voltage values $g$ and $h$, the current being current to the plate (cylinder), the anode potential being held constant. This effect may be made use of in various ways, one example being given in Fig. 8 in which oscillations are generated in the tuned circuit 39 serving as a useful load such as an antenna. The focusing coil 7 is in this case connected between the cathode and battery 15. The plate (cylinder) is connected to the resonant circuit 39 and to a point in battery 15 of such potential as to cause operation in the region of supply voltage in which the falling characteristic occurs. Over the negative resistance region, increasing the potential of the plate (cylinder) increases the space current, hence the focusing, with the result that the electrons are focused onto the anode and the current to the plate decreases. A voltage swing between the terminals of resonant circuit 39 in the direction corresponding to increase in plate current causes a still further increase in plate current and in the original voltage variation until the condenser in the tuned circuit becomes charged in that direction whereupon a reversal in the process takes place until the condenser is charged to opposite potential, and the cycle repeats itself.

Figure 12:
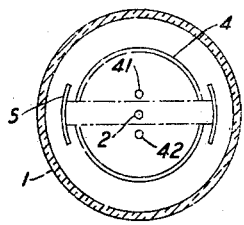
Figs. 12, 18 and 20 are diagrammatic plan views of electrostatically focused tubes according to the invention.
Figure 13:
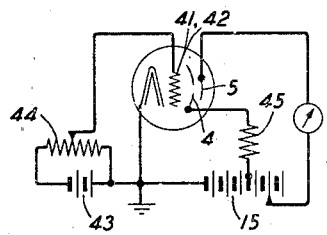
Figs. 13, 17 and 19 are circuit views using electrostatic focusing.

Generally similar results to those described in connection with magnetic focusing can also be obtained by use of electrostatic focusing. A tube for such purpose is shown in diagram in Fig. 12, plan view. The elements 1, 2, 4 and 5 are the same as in the previous figures. A pair of grid wires 41, 42 one on each side of the cathode and parallel to the cathode will focus the beam when supplied with proper potential. In Fig. 13 this potential is supplied from battery 43 and potentiometer resistance 44. The plate is connected through high resistance 45 to a point of positive potential within battery 15. In one example the electrons were focused into a beam passing to the anode when the grid wires were at −35 volts, plate +200 volts and anode +224 volts. For grid potentials either above or below this value the anode current was decreased. For grid voltages more positive than this value, an increase in negative bias on the grid wires increased the anode current and in this region the characteristic of the tube therefore exhibited negative transconductance (e. g., −160 micromhos). On the negative side of the focus value of bias the tube exhibited the usual positive transconductance. When the beam is focused there is a constant ratio between negative grid potential and positive plate potential.

Referring to Fig. 13, the action of this circuit is as follows: starting with the grid wires 41, 42 sufficiently negative to cut off all electrons, this bias is gradually reduced by movement of the slider along resistance 44 toward the right. When the cut-off voltage is passed electrons will start to flow, principally to the plate 4 and will set up current flow in the external resistance 45, thus lowering the potential of plate 4. As the grid bias is made still less negative and, consequently, the plate voltage is made less positive, the ratio of plate voltage to grid bias is approached corresponding to the condition of focus. When such condition is reached the electrons will be focused off the plate onto the anode 5 and the decreased current in the resistance 45 will give rise to increased potential on the plate 4 drawing forth more electrons and augmenting the condition of focus. The action is therefore regenerative and the electrons will suddenly focus into a beam (or two beams) on the anode; that is, the tube will trigger on.

After the focused condition is established the grid bias may be increased or decreased over a considerable range and the tube will hold itself in focus due to the action of the plate potential. In other words, the focused condition is stable. If, however, the grid bias is made sufficiently negative, the plate can no longer maintain the condition of focus and the tube will trigger off.

Figure 14:
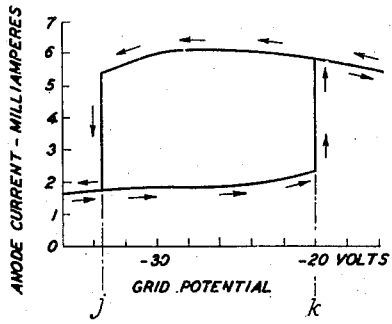
Figs. 14, 15 and 16 show operating characteristics for circuits using electrostatic focusing.

The characteristic curve corresponding to this cycle of operation is shown in Fig. 14. This characteristic was obtained with an anode potential of 224 volts, a plate potential of 200 volts and with a value of resistance 45 equal to 2 megohms. The tube triggered on at a grid potential of value $k$ and triggered off at grid potential $j$ with increasing negative grid potential.

Figure 15:
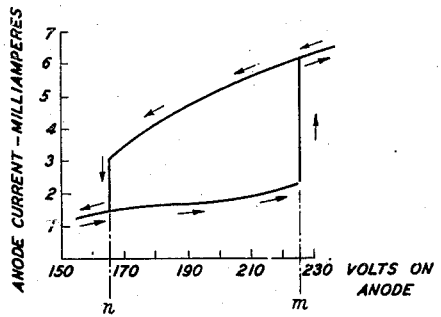

As in the magnetically focused case the electrostatically focused tube may also be triggered on and off by holding the grid bias constant and varying the potential supplied to the plate and anode, the cycle for this operation being shown in Fig. 15. The tube triggered on when the anode voltage was slightly increased in the region of the value $m$ and triggered off for descending values of anode voltage when the voltage $n$ was reached. The grid wires were held at −20 volts, the plate supply potential was 200 volts and the external resistance 45 was 2 megohms.

Figure 17:
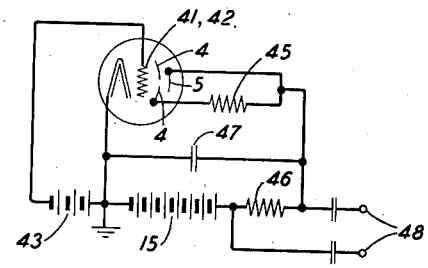

This relationship can be used in a relaxation type oscillator as illustrated in Fig. 17. The grid wires 41 and 42 are held at constant negative bias potential by battery 43. Assuming that the tube is triggered off and that the condenser 47 is being charged through high resistance 46, the potential of the plate 4 and anode 5 is increasing as the potential builds up across the condenser. Space current starts flowing to the plate 4 and the triggering on action proceeds as previously described by focusing the electrons off the plate onto the anode with consequent increase in potential of the plate and greatly augmented space current flow. When the tube thus triggers on the condenser 47 discharges through the tube more rapidly than the charge can be built up through resistor 46. This discharge path through the tube is almost entirely between the anode 5 and the cathode, since the beam is at this time well focused. As the condenser discharges the potential falls lowering the potentials of both plate 4 and anode 5 and weakening the focusing effect until eventually the potential of the plate 4 is no longer able to sustain the discharge with the existing negative grid potential and the tube triggers off. The condenser 47 then begins to charge again through resistance 46 and the process repeats itself. The oscillations may be taken off to a suitable load circuit from across resistance 46 by terminals 48.

Figure 16:
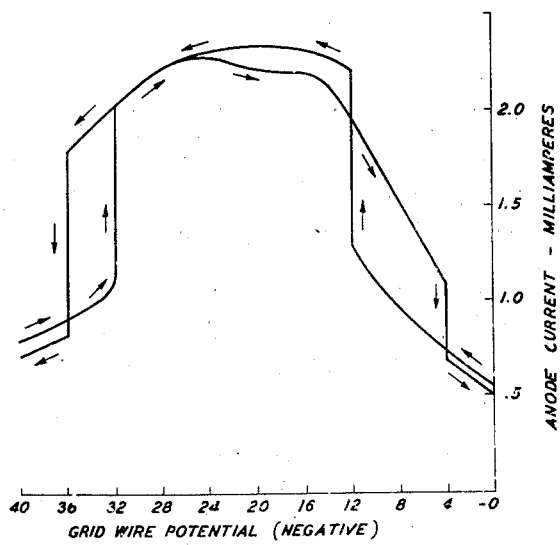

Fig. 16 shows a cycle of operation in which the triggering action may be accomplished on both sides of focus. For this condition, the plate supply potential was 175 volts, the anode potential was 197 volts and the resistance 45 (Fig. 13) was 2 megohms. With the grid potential initially at zero a negative bias of 12 volts causes the tube to trigger on after which it may be triggered off by either a positive swing of the grid bias to −4 volts or a still further negative swing of the grid bias to −36 volts. By decreasing numerically the negative bias from greater than −32 volts to less than −32 volts the tube is made to trigger on.

Figure 18:
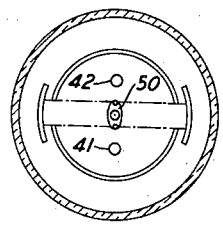

Fig. 18 represents in diagram a modified structure in which a positive grid 59 is used adjacent the cathode for increasing the space current at low voltages and for protecting the cathode. In this case the focusing grid wires 41 and 42 are made of large diameter and could advantageously be hollow cylinders. Such a structure has the advantage of reducing the anode current before triggering on and increasing it after the tube has triggered on.

Figure 19:
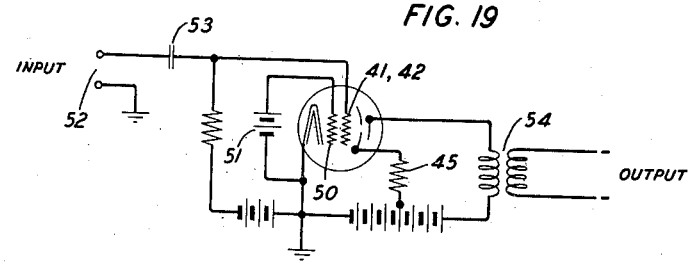

Fig. 19 illustrates a circuit using the type of tube shown in Fig. 18, the grid 50 being made positive from battery 51. Input variations are supplied from terminals 52 through series coupling condenser 53 to the focusing grid wires 41, 42. The load is taken off in any suitable manner such as through output transformer 54.

Figure 20:
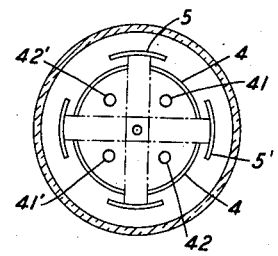

Fig. 20 illustrates a modified type of electrostatically focused tube in which the plate 4 is divided into four quadrants and in which there are two pairs of anodes 5 and four beams; the focusing grid wires are shown at 41, 42, 41′, 42′.

Several illustrative embodiments of the invention have been given to indicate that the invention is capable of a variety of embodiments and applications. The forms disclosed are to be taken as illustrative and are not to be construed as limiting the invention the scope of which is defined in the claims which follow.

What is claimed is:

1. In combination, a space discharge device having a cathode, and output electrodes comprising an anode and a plate, means to apply steady positive voltage to said anode and plate, beam-forming means for the emission from said cathode, said emission, when not formed into a beam, dividing between the anode and plate, means controlled by emission going to the plate for causing the beam-forming means to increase the proportion of the total emission going to the anode, means controlled by an increase in emission to the anode for causing said beam-forming means to augment the increase in the proportion of the total emission going to the anode, and external circuit means responding to the variation in emission going to one of said output electrodes.

2. The combination as recited in claim 1, in which said beam-forming means comprises magnetic focusing means including an electromagnet having a winding, and means deriving current for said winding from one of said output electrodes.

3. The combination as recited in claim 1, in which said beam-forming means comprises a grid adjacent the cathode, and means for controlling the relative steady potentials of said cathode, grid and plate.

4. In combination, a space discharge device having a cathode, an anode and a plate, means to apply steady positive potential to said anode and plate, means controlled by an applied voltage for focusing the emission from said cathode into a beam, said anode and plate being positioned so that both receive emission from the cathode when the cathode emission is not focused into a beam but a greatly increased proportion of the emission goes to the anode when the cathode emission is focused into a beam, an external output circuit connected between said cathode and said anode and plate, and means responsive to a decrease in the flow of plate current in said output circuit for both focussing the beam on said anode and greatly increasing the strength of the beam.

5. In combination, a space discharge device having a cathode, a plate and an anode positioned to receive emission from said cathode, a source of steady voltage having its negative terminal connected to said cathode and a positive terminal connected to each said plate and anode, a resistive impedance connected between said plate and the point of connection of the plate to said positive terminal, means to focus the cathode emission into a beam incident upon said anode, means to use the current flowing through said resistive impedance to control the focussing of said beam and means controlled by anode current to vary the focusing of said beam.

6. In combination, a space discharge device having a cathode, a plate and an anode both positioned to receive emission from said cathode when the emission is diffuse, means controlled by emission striking the plate for causing the emission to be focused upon the anode and means responsive to a decrease in emission striking the plate for causing increased electron current to the anode.

7. In combination, a space discharge device having a cathode, a plate and an anode both positioned to receive emission from said cathode when the emission is diffuse, means controlled jointly by emission striking the plate and by emission striking the anode for causing the emission to be focused upon the anode and means responsive to a decrease in emission striking the plate for causing increased electron current to the anode.

8. A trigger tube comprising a cathode, a plate and an anode, means to apply positive voltage to the plate and anode, said plate and anode being both positioned to receive emission from the cathode, means responsive to an increase in emission to the plate to concentrate the emission into a beam and cause a greater proportion of the total cathode emission to go to said anode, means caused by the consequent decrease in the portion of the emission going to the plate to increase the intensity of the emission beam going to the anode, and means caused by increase of intensity of the emission beam going to the anode to increase still further the emission going to the anode.

9. A trigger tube according to claim 8, including a grid, means normally biasing the grid to near the cut-off point, and means to apply a voltage to the grid to increase the emission to start the first-mentioned increase of emission to the plate.

10. In combination, a space discharge device having a cathode, a plate and an anode, an external magnetic coil for magnetically focusing the cathode emission into a beam incident upon the anode, the cathode emission when not focused into the beam being diffuse and going to both said plate and anode, means to apply steady positive potential to said anode and plate with respect to said cathode, said focusing coil being serially included in circuit with both said plate and anode, and a high resistance in series between said plate and coil.

11. The combination according to claim 10, including a grid for controlling the emission to said plate and anode, means normally biasing the grid negatively beyond cut-off, and means to apply input voltage variations to said grid to initiate current flow to said plate and anode.

12. The combination according to claim 10, including a second resistance connected between said positive potential applying means and said focusing coil and a condenser connected from a point between said second resistance and coil to said cathode, whereby said combination operates as a relaxation oscillator.

13. An impulse producing circuit comprising a space discharge device having an electron emitting cathode, a plate and an anode, an external circuit from the cathode to said plate and anode, means to focus the electron emission into a beam going to the anode, said emission when not focused going mostly to the plate, means responsive to current flow in said external circuit for controlling the focusing within the tube, an emission-controlling electrode, a source of control impulses therefor, means to derive positive impulses from a portion of said output circuit connected to said plate, and means to derive negative impulses from a portion of said output circuit connected to said anode.

14. A space discharge device comprising an electron emitting cathode, a plate and an anode, an external circuit connecting said cathode to said plate and anode, means to focus the electron emission into a beam on said anode, said emission when not focused going mostly to said plate, said means comprising an electromagnet embracing the electron discharge space in said device and having an energizing coil, said coil being serially included in said external circuit between said cathode and both said plate and anode, and a work circuit connected to said plate.

15. In a space discharge device, an electron emitting cathode, two positive electrodes, means to apply positive voltage to the latter, a focusing grid for focusing the emission into a beam incident mostly upon the second positive electrode, said emission when not focused going mostly to the first positive electrode, means to apply focusing voltage to the focusing grid, a high resistance between the positive voltage source and first positive electrode, current responsive means connected to the second positive electrode, and means to trigger said device on by reduction of the focusing voltage toward a value at which the focusing is maximum and to trigger said device off by reduction of said focusing voltage through and beyond said value to values at which the total emission to said positive electrodes is diminished.

16. In combination, a space discharge device having a cathode, an anode and a plate both positioned to receive emission from said cathode, a resistor connected in series with the plate, a source of positive voltage connected through said resistor to the plate and connected to the anode, means responsive to an increase in emission to the plate to concentrate the emission into a beam and cause a greater proportion of the total cathode emission to go to the anode, resulting in a decrease of emission current to the plate, a corresponding decrease in potential drop across said resistor and a consequent increase in plate potential, said increase in plate potential greatly augmenting the space current by drawing out more electrons from the cathode.

17. In combination, a space discharge device comprising an electron emitting means, a plate and an anode, a source of voltage for applying positive potential to the plate and anode with respect to the cathode, a high resistance connected between the plate and the positive pole of said source, and means for focusing the electron emission from said emitting means into a beam, said emission when not focused mostly striking said plate and when sharply focused striking substantially entirely said anode, said focusing means depending for its effectiveness on the plate potential and operating in response to large emission current to the plate with consequent lowered plate voltage to focus the beam off the plate onto the anode, causing the plate potential to rise and accelerate emission to the anode.

ALBERT M. SKELLETT.